United States Patent [19]

Prochazka

[11] 4,236,188

[45] Nov. 25, 1980

[54] COAXIAL TERMINAL PROTECTION DEVICE WITH DISPOSABLE CARTRIDGE

[75] Inventor: Rudolph J. Prochazka, Springfield, Va.

[73] Assignee: The United States of America as represented by the Secretary of the Army, Washington, D.C.

[21] Appl. No.: 3,179

[22] Filed: Jan. 15, 1979

[51] Int. Cl.³ .............................................. H02H 3/22
[52] U.S. Cl. ...................................... 361/111; 361/91; 361/56; 361/119; 339/14 R; 174/52 R
[58] Field of Search ............... 361/111, 110, 91, 56, 361/118, 119, 331, 392, 395, 400, 380; 339/14 R, 14 L, 89 C, 90 C, 91 P, 17 R, 17 C, 17 CF, 17 N; 338/21, 20; 174/52 R, 59, 63

[56] References Cited

U.S. PATENT DOCUMENTS

| | | | |
|---|---|---|---|
| 2,989,623 | 6/1961 | Byrne | 361/393 |
| 3,040,288 | 6/1962 | Edlen et al. | 339/89 C X |
| 3,274,447 | 9/1966 | Nelson | 361/119 |
| 3,622,939 | 11/1971 | Forney, Jr. | 339/89 C |
| 3,711,794 | 1/1973 | Tasca et al. | 338/21 X |
| 3,777,219 | 12/1973 | Winters | 361/118 |
| 3,863,111 | 1/1975 | Martzloff | 361/119 |
| 3,980,931 | 9/1976 | McLellan | 361/91 X |
| 4,145,729 | 3/1979 | Hayward | 361/119 |

*Primary Examiner*—Patrick R. Salce
*Attorney, Agent, or Firm*—Nathan Edelberg; Robert P. Gibson; Saul Elbaum

[57] ABSTRACT

Protective electronic circuitry is disclosed using coaxial connector technology and incorporating a disposable cartridge containing an electronic circuit for protecting communication equipment having coaxial inputs.

11 Claims, 7 Drawing Figures

COAXIAL TERMINAL PROTECTION DEVICE WITH DISPOSABLE CARTRIDGE

RIGHTS OF THE GOVERNMENT

The invention described herein may be manufactured, used, and licensed by or for the United States Government for governmental purposes without the payment to me of any royalty thereon.

BACKGROUND OF THE INVENTION

The present invention relates to protective devices for communication equipment, and more particularly to protective devices utilizing disposable cartridges within coaxial connectors for such communication equipment.

High energy electromagnetic pulses, as exist in a nuclear detonation environment, for example, or elsewhere, may damage communication equipment if permitted to penetrate such equipment. In order to protect the equipment, including transceivers, for example, from such pulses, various protective devices are available. "Spikeguard suppressors" are available from Fisher Custom Communications, Box 581, Manhattan Beach, Calif., 90266, for example. Low capacitance protective circuitry for suppression of fast rise-time transients is disclosed by O. Melville Clark, of General Semiconductor Industries, Tempe, Arizona, in a paper delivered at the 1975 Electromagnetic Compatibility Symposium. A connector configuration as specified in the Clark reference is further disclosed in U.S. Pat. No. 3,777,219. Clark discloses several circuits which may be used to protect transceivers, including a bridge circuit utilizing a center zener diode as contemplated in the present invention.

However, none of the references or devices previously available permit easy, quick and inexpensive replacement of the devices in the event that failure occurs or a device with different characteristics is desired. Moreover, prior art devices generally require discarding of the entire container along with the electronic circuitry in the event of replacement. Special connectors have to be designed therefor, adding to the expenses involved.

Accordingly, it is an object of the present invention to overcome the deficiencies of the prior art and provide a protective device for utilization in electronic equipment having coaxial fittings.

It is another object of the invention to provide a coaxial protective device having a replaceable and disposable cartridge therein, the cartridge containing the protective electronic circuitry.

Yet another object of the invention is to provide protective devices in coaxial plug-in components or in other coaxial connectors, without restriction to a specific connector.

Yet another object of the invention is to provide a coaxial coupler having a disposable cartridge for use as an adaptor between coaxial connectors on an electronic equipment and a coaxial cable.

It is another object of the invention to provide a coaxial bulkhead coupler having a disposable cartridge therein for protecting the equipment connected thereto.

Still a further object of the invention is the provision of a coaxial coupler having a disposable cartridge with protective circuitry therein for coupling two coaxial cables.

Still another object of the invention is the provision of a coaxial coupler with electronic circuitry on a disposable cartridge therein having any one of the possible combination of male and female coaxial connectors at its two ends.

Still another object of the invention is the provision of protective electronic circuitry on a cartridge compatible with a plurality of connector types.

It is an additional object of the invention to provide protective circuitry for a transceiver with easy access to the components mounted therein. An additional object of the invention is the provision of a pre-assembled protective device including a cartridge in a coaxial connector for quick replacement of a faulty device.

SUMMARY OF THE INVENTION

In accordance with the preceding objects, the present invention provides protective devices mounted in disposable cartridges within standard coaxial connectors or within housing units fabricated and adapted for use with standard coaxial connectors. In accordance with the present invention, as an adaptor it may be used with a particular housing to provide male-male, male-female, or female-female connectors having the disposable electronic circuitry therein. Moreover, in addition to the ability to provide protection in a connector between the various combinations of male and female connections, the present invention permits the interconnection of different types of coaxial connectors, for example, by using a BNC male and an N-type female connector on either end of a housing.

BRIEF DESCRIPTION OF THE DRAWING

The preceding features, objects, and advantages of the present invention will become more readily apparent from the following specification and appended claims, when considered in conjunction with the attached drawing wherein:

DETAILED DESCRIPTION OF THE INVENTION

Figure 1A:
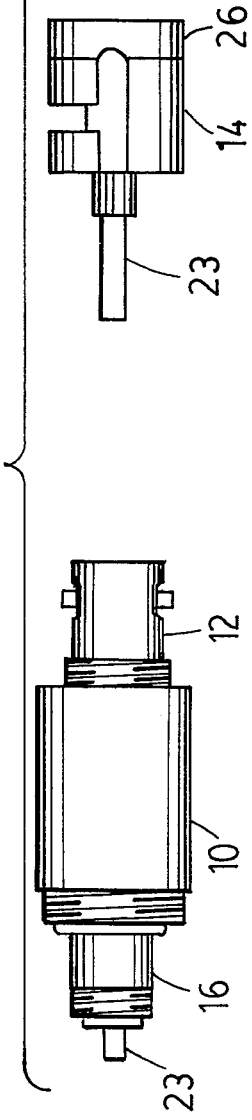
FIGS. 1A, 1B, and 1C show three embodiments of the present invention.
Figure 1C:
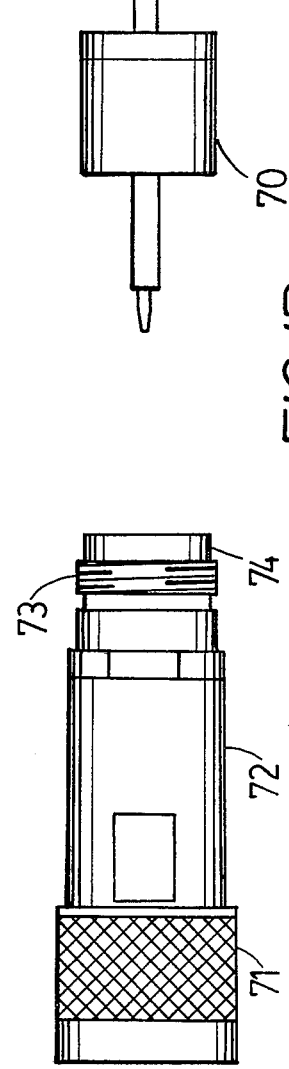
Figure 1B:
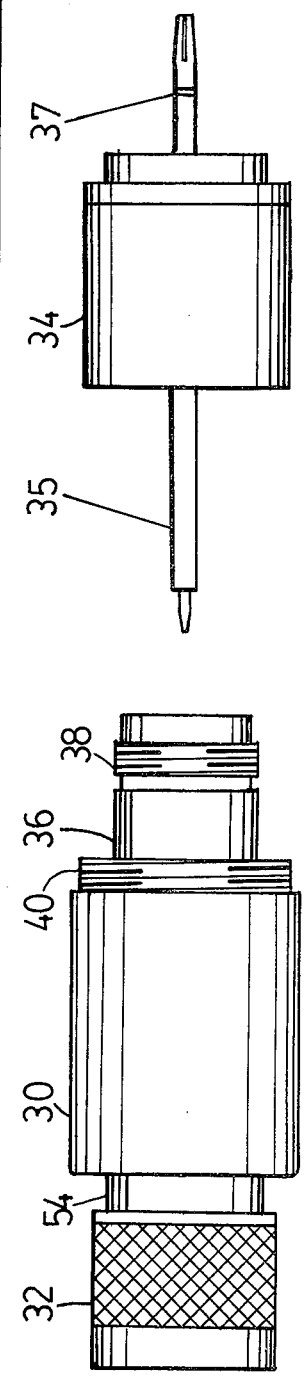
Figure 2:
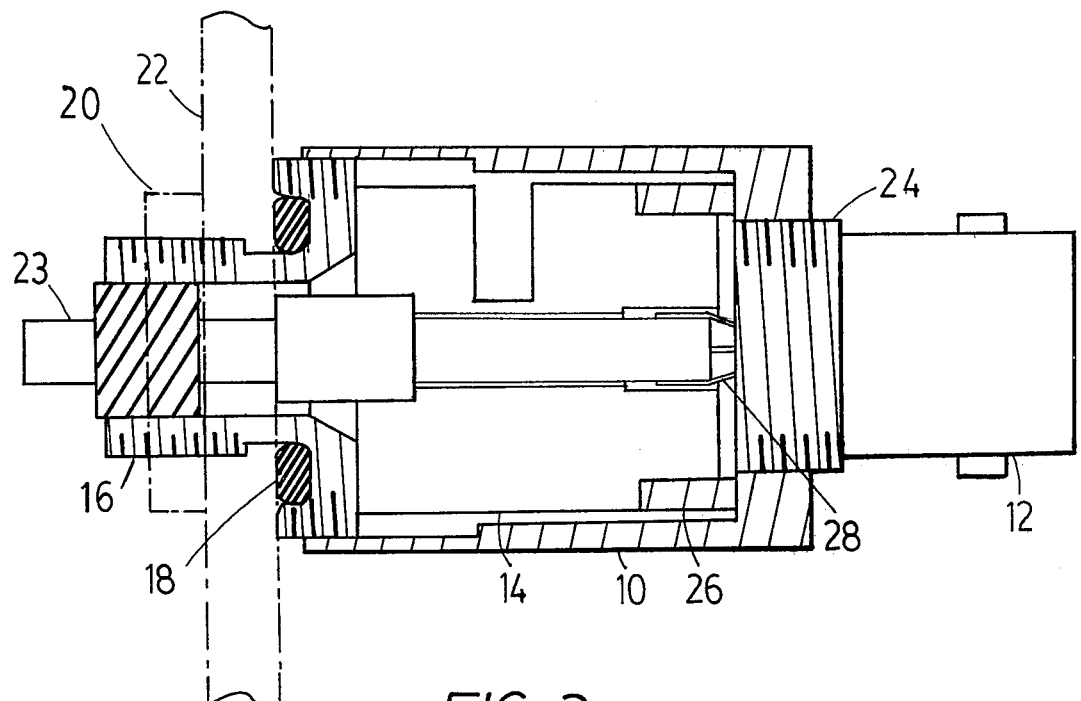
FIG. 2 shows the embodiment of FIG. 1A, partly in cross section.

FIGS. 1A, 1B and 1C show three embodiments of the present invention. FIG. 1A is an embodiment of the present invention for use as a permanent installation device, having an internally threaded housing 10 constructed to fit on a BNC connector 12. Cartridge 14, separately shown, is also shown in an inserted position within the housing. A separate cap, or adaptor, 16, threaded to fit within the internal threads of housing 10, is threaded over the cartridge protruding from the end opposite to the BNC connector. The separate cap may be threaded for further connection to other devices, and may be threaded to accept a BNC connector, for example. Additionally, the adaptor may itself be a coaxial connector or, as shown in the preferred embodiment, may have a conduit for terminal 23 of cartridge 14, which may contact a conductor in the device to which the adaptor is connected. The device is shown in greater detail, partially in cross section, in FIG. 2, wherein an O-ring 18 is indicated as providing a water seal between the device mount, shown in phantom as a chassis wall 22, and end cap, or adaptor, 16. The adaptor may have a panel mounting nut 20, shown in phantom, threaded thereon and may thus be permanently mounted to the chassis 22 of a receiver of transmitter. The adaptor is provided with a hollow center portion to permit passage therethrough of an elongated terminal connector 23 on cartridge 14. As also shown in FIG. 2, the BNC connector 12 is threaded at 24 for threaded engagement of housing 10. Cartridge 14 is provided with a ground ring 26, preferably made of brass for contacting housing 10. A short pin 28 extends to a receiver therefor provided in connector 12 to contact the central conductor of the female connector 12.

FIG. 1B shows a specially constructed housing 30, built to connect to standard type N male connectors, shown at 32. The connector is available as a UG 21E connector having standard contacts for mating with the internal and external conductors of a coaxial device. The cartridge, shown at 34, inserts within housing 30 between the male connector 32 and a female connector 36, and has two projecting terminals, 35 and 37. Terminal 35 provides the male contact at 32, and terminal 37 the center female contact at 36. Female connector 36 is a standard item typically available as a type UG-58 connector.

Figure 3:
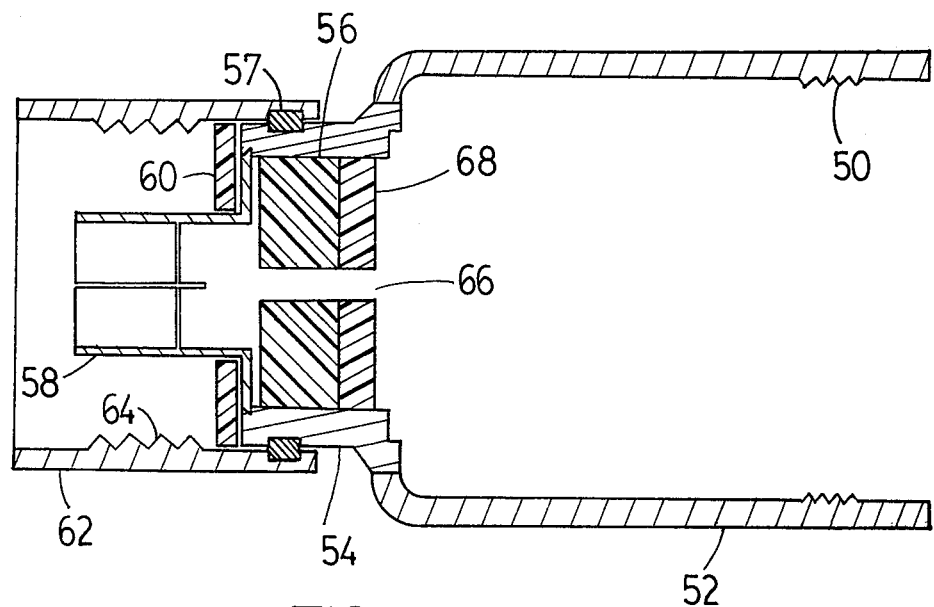
FIG. 3 shows a cross-sectional view of a portion of FIG. 1B.
Figure 4:
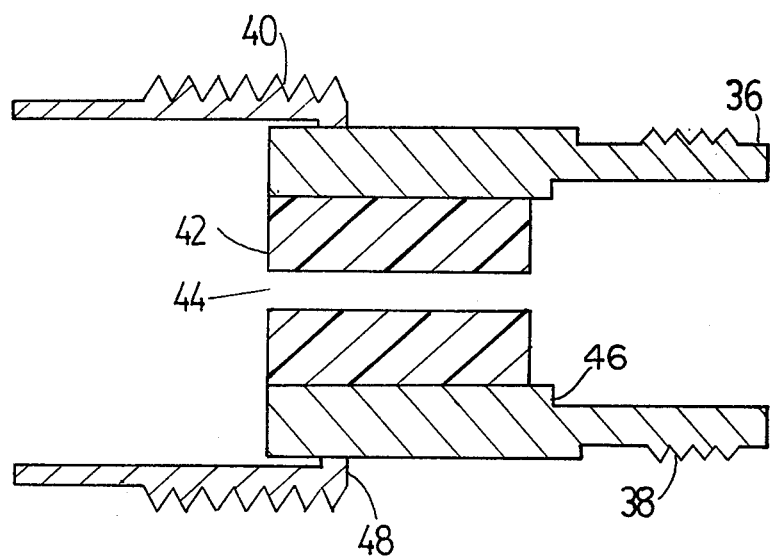
FIG. 4 shows a cross-sectional view of another component of the embodiment of FIG. 1B.

FIG. 3 illustrates a cross-sectional view of the housing and male connector of the device shown in FIG. 1B. The female connector, which is removable from the housing, is shown in FIG. 4 at 36, and is provided with an external thread 38 for interface with a cable. A second thread 40 is provided for connection to the housing.

The connector 36 includes a nylon or Teflon insulator 42 having an opening 44 therein for the female terminal 37 of the cartridge.

A ridge 46 is provided in the female connector for resting a finger stock of a male connector attaching thereto. The outer thread 40 is formed on an element 48 which is pressed on the standard female connector 36.

Housing 30, having internal threads 50 therein for receiving threads 40 of the female connector 36, includes a shell 52. The shell 52 is pressed on the body 54 of a standard N-type connector. The body is shown as having been cut away to accommodate the housing. Body 54 is connected to the remainder of the male type connector in a standard fashion with the aid of a keying ring 57, and is shown as having a Teflon insulator 56.

A finger stock 58 is shown as resting on the body 54. A rubber gasket 60 surrounds the fingers. A collar 62 includes therein an internal thread 64 for connection with a female section of a type N connector.

Shell 52 is shown and described as being pressed onto body 54 to form the housing 30 for cartridge 34 used in conjunction with the male type connector 32, and brass element 48 is shown pressed onto female connector 36. Clearly, however, a threaded element may be pressed onto male connector 32 and a shell may be pressed onto female connector 36 without departing from the scope of the present invention.

The cartridge 34 is intended to be inserted within housing 30, the male end thereof protruding through an opening 66 provided in a nylon insulator 68 included in the body of the connector.

FIG. 1C illustrates the use of a cartridge 70 embodying the present invention in a standard UG-21B type N connector 71, wherein no special housing needs to be constructed. Specifically, the cartridge is designed to fit completely within the body 72 of the connector. The body 72 is threaded as shown at 73, at the end opposite connector 71 to receive a female connector. Such connectors are typically used to terminate coaxial cables, and illustrate the advantageous use of the present invention as a replaceable or disposable cartridge on coaxial cable terminations.

A standard female connector 74 may be used, or may be modified to fit within a nut to secure the cable into the connector housing.

The invention thus provides a disposable cartridge which may be used in a connector to a transceiver or other equipment having coaxial cable inputs. The cartridge contains transient protection circuitry which may include diode bridges and/or spark gaps and the like.

Figure 5:
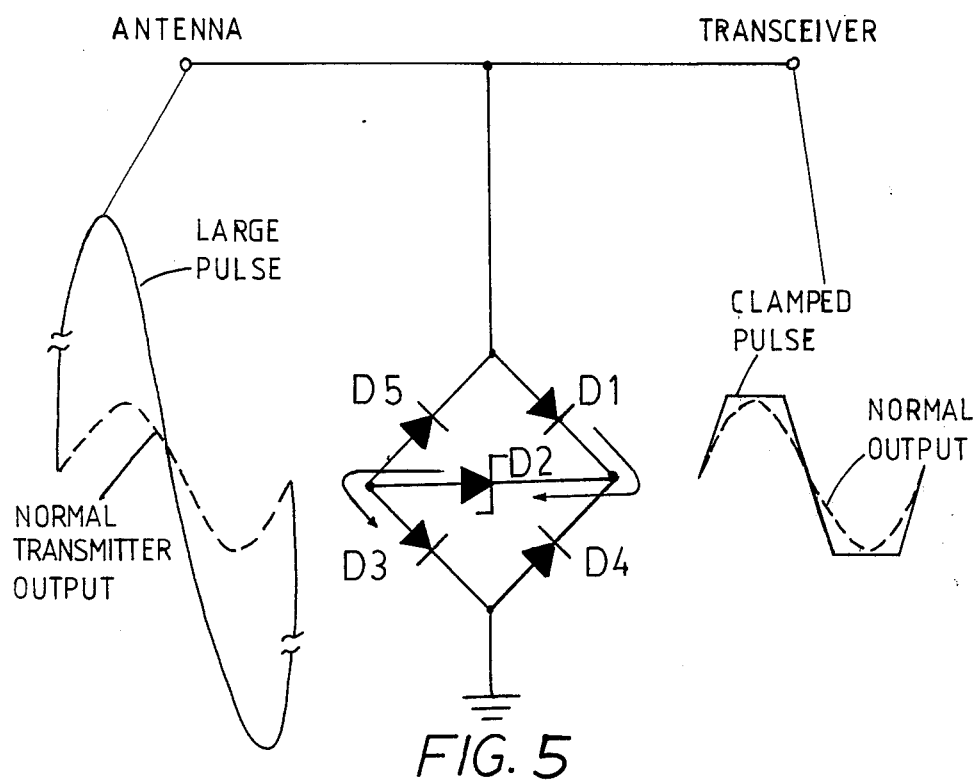
FIG. 5 shows a circuit used in the cartridges of the present invention.

Various active or passive circuits could be installed in the cartridge to perform other functions as well, however. Particularly, the present invention contemplates the use of a protection device for minimization of the effects of transient surges on the line by utilizing the circuit shown in FIG. 5. In the circuit, the leads marked "Antenna" and "Transceiver" are connected to terminal connector 23 and pin 28 in FIGS. 1A and 2, for example. The ground terminal shown in FIG. 5 is connected to ground ring 26. The circuit of FIG. 5 is thus enclosed within the cartridge 14 and electrical connections thereto made by means of terminal connector 23, pin 28 and ground ring 26. However, filters or other circuits might similarly be installed in a removable or replaceable cartridge for use in a connector as disclosed herein.

In FIG. 5 four signal rectifiers (D1, D3, D4 and D5) and a clamping device, which may be bipolar and is shown, for example, as a zener diode (D2), are used. The circuit represents a basic single phase, full-wave rectifier bridge with the addition of the shunt diode D2. The zener diode D2 is connected between the two common diode junctions (anode-anode and cathode-cathode) of D3, D5 and D4, D1. Thus, whenever a rectifier (D1-D3 or D4-D5) is forward biased, as by the appearance of a large positive or negative transient signal at the antenna, the zener diode D2 is reverse biased. The circuit thus provides a clamping level determined by the reverse bias voltage of zener diode D2, and functions analogously to a bipolar limiter.

The zener diode is selected for a predetermined clamping level, which must be above the output voltage of the equipment in order not to interfere with its performance. The zener diode is specifically selected to clamp all signal levels above the normal output signal of the equipment. A low insertion loss is highly desirable in a circuit to be used as presently contemplated. Utilization of low junction capacitance diodes for D1, D3, D4 and D5 achieves the desired low insertion loss over the entire frequency range of the transceiver. The junction capacitance of the shunt diode D2 does not affect the bridge capacitance and accordingly, D2 may be chosen for its clamping voltage and not for its junction capacitance.

The waveforms shown on either side of the circuit are illustrative of the proper functioning of the circuit, showing normal transmitter output and the effect of a large electromagnetic pulse on the transceiver in the presence of the present circuit.

Other protective devices might be used for minimization of damage to a transmitter, the device responsive to a sensing of an open circuit upon sudden disconnect of the antenna from the transmitter output.

The device is constructed to fit within standard connectors, or within a housing provided for attachment to a connector, the housing being provided for the cartridge and further having a second connector at the other end thereof.

I wish it to be understood that I do not desire to be limited to the exact details of construction shown and described, for obvious modifications can be made by a person skilled in the art.

I claim:

1. Apparatus for affecting a circuit characteristic of an electronic device comprising:
   (a) first coaxial connecting means, having a first means for providing electrical contact with an internal conductor of a first coaxial device connected thereto and a second means for providing electrical contact with an external conductor of the coaxial device connected thereto,
   (b) a housing attached to said first coaxial connecting means and in electrical contact with the second means thereof, and
   (c) replaceable cartridge means having electrical components therein and electrical terminals connected thereto,
   (d) said replaceable cartridge means adapted for fitting in said housing, and having a first one of the electrical terminals thereof adapted to provide electrical contact with the internal conductor of the first coaxial device connected to said first coaxial connecting means by cooperating with said first means of said first coaxial connecting means,
   (e) said replaceable cartridge means having a second electrical terminal thereof in electrical contact with said housing, and
   (f) said replaceable cartridge means having a third electrical terminal thereof adapted to establish electrical contact with said electronic device.

2. Apparatus as recited in claim 1 wherein said replaceable cartridge means and said housing each have a circular cross section, and wherein said second one of said electrical terminals of said replaceable cartridge means is placed along the circumference of the circular cross section of said replaceable cartridge means for contacting the circular cross section of said housing.

3. Apparatus as recited in claim 2 further comprising mounting means attached to said housing for attachment to said electronic device, and for providing electrical contact therebetween, said mounting means having a connecting means therein for establishing electrical contact between said third one of said electrical terminals of said replaceable cartridge means and a conductor of said electronic device.

4. Apparatus as recited in claim 2 further comprising second coaxial connecting means attached to said housing having a first means for providing electrical contact with an internal conductor of a second coaxial device connected thereto and a second means for providing electrical contact with an external conductor of the second coaxial device connected thereto,
   said second means of said second coaxial connecting means being in electrical contact with said housing, and
   said third one of said electrical terminals of said replaceable cartridge means being adapted to provide electrical contact with the internal conductor of the second coaxial device connected to said second connecting means by cooperating with said first means of said second coaxial connecting means.

5. Apparatus as recited in claim 4 wherein said first and second coaxial connecting means are of the same type.

6. Apparatus as recited in claim 4 wherein said first and second coaxial connecting means are of different types.

7. Apparatus as recited in claims 5 or 6 wherein said first and second coaxial connecting means are of the same male/female designation.

8. Apparatus as recited in claims 5 or 6 wherein said first and second coaxial connecting means are of differing male/female designations.

9. Apparatus as recited in claim 4 wherein said electrical components of said replaceable cartridge comprise a circuit for suppressing electrical transients.

10. Apparatus as recited in claim 4 connected between a coaxial cable and an electrical transceiver.

11. Apparatus as recited in claim 4 connected between two coaxial cables.

* * * * *